United States Patent [19]

Shibuya

[11] Patent Number: 4,466,522
[45] Date of Patent: Aug. 21, 1984

[54] ELECTROMAGNETIC SPRING-WOUND CLUTCH

[75] Inventor: Tsunenori Shibuya, Konan, Japan

[73] Assignee: Diesel Kiki Co., Ltd., Tokyo, Japan

[21] Appl. No.: 283,342

[22] Filed: Jul. 14, 1981

[30] Foreign Application Priority Data

Jul. 15, 1981 [JP] Japan .................................. 55-99393

[51] Int. Cl.³ ......................... F16D 7/00; F16D 27/00; F16D 41/20
[52] U.S. Cl. .................................... 192/36; 192/41 S; 192/84 T
[58] Field of Search ...................... 192/52, 81 C, 84 E, 192/35, 41 S, 84 T, 36

[56] References Cited

U.S. PATENT DOCUMENTS

| | | | |
|---|---|---|---|
| 3,735,847 | 5/1973 | Brucken | 192/35 |
| 3,746,137 | 7/1973 | Ruschke | 192/52 X |
| 3,831,723 | 8/1974 | Briar et al. | 192/35 |
| 4,225,027 | 9/1980 | Takefuta et al. | 192/35 X |

*Primary Examiner*—Cornelius J. Husar
*Assistant Examiner*—Joseph A. Fischetti
*Attorney, Agent, or Firm*—Frishauf, Holtz, Goodman & Woodward

[57] ABSTRACT

An electromagnetic spring-wound clutch comprising a driving member, a driven member axially aligned with the driving member, a coil spring mounted around both the driving and driven members, a first clutch armature member interposed between the driving member and the coil spring and operatively connected to the coil spring, and at least one second clutch armature member rotatably interposed between the first clutch armature member and the driving member. When the clutch is actuated, the first, second clutch armature members and the driving member are brought into frictional engagement with each other, immediately after occurrence of slight slips between the second clutch armature member and the driving member and between adjacent ones of the first clutch armature member and the at least one second clutch armature member.

7 Claims, 4 Drawing Figures

ELECTROMAGNETIC SPRING-WOUND CLUTCH

BACKGROUND OF THE INVENTION

This invention relates to electromagnetic clutches, and more particularly to electromagnetic spring-wound clutches for use in refrigerant compressors for automotive air conditioners or other like devices.

Conventionally, a refrigerant compressor which is used in an automotive air conditioner is provided with an electromagnetic clutch which is arranged between the compressor and the output shaft of an automotive engine associated with the air conditioner to transmit torque from the engine to the compressor. Such an electromagnetic clutch is a spring-wound type comprising a driving member and a driven member axially aligned with each other for rotation about a common axis, a coil spring mounted around the driving and driven members for gripping engagement therewith and operatively connected at its one end to the driven member, and a clutch armature plate operatively connected to the other end of the coil spring. When the electromagnetic clutch is actuated, the clutch armature plate is drawn into frictional contact with a radial wall formed on the driving member due to electromagnetic force produced in an electromagnetic coil provided in the clutch, to cause the coil spring to be wound into gripping engagement with the driving and driven members to effect driving connection between the driving member and the driven member.

When the electromagnetic spring-wound clutch having the above arrangement is actuated when the engine is rotating at a high speed, large impact load is suddenly applied to the driven shaft of the refrigerant compressor, which can result not only in deformation or breakage of the component parts of the compressor body and the clutch, but also in the occurrence of noise caused by friction between the coil spring and the parts on which the coil is wound, as well as in abrasion in the coil spring and its associated parts.

OBJECT AND SUMMARY OF THE INVENTION

It is therefore the object of the invention to provide an electromagnetic spring-wound clutch which, when actuated, imparts a very small amount of impact load to a driven device associated therewith to thereby avoid the aforementioned influence to be exerted upon the component parts of the driven device and the clutch and also minimize the frictional noise.

According to the invention, at least one second clutch armature member is rotatably interposed between a driving member and a first clutch armature member. This second clutch armature member is mounted on the driving member for frictional engagement with a radially extending surface formed on the driving member. The driving member and first and second clutch armature member are disposed immediately adjacent each other and in axial alignment with each other. When the electromagnetic coil of the clutch is energized, the first and second clutch armature members are attracted and drawn toward the driving member into frictional engagement with each other immediately after occurrence of slight slips between the radially extending surface of the driving member and one of the at least one second clutch armature member adjacent thereto and between adjacent ones of the first clutch armature member and the at least one second armature member.

The above and other objects, features and advantages of the invention will be more apparent from the ensuing description taken in connection with the accompanying drawings in which:

DETAILED DESCRIPTION

Figure 1:
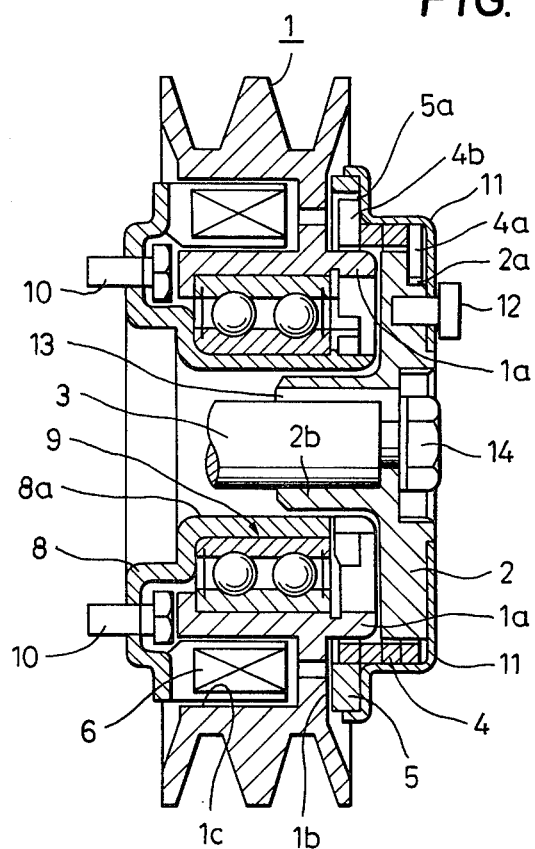
FIG. 1 is a cross-sectional view of a conventional electromagnetic spring-wound clutch.

FIG. 1 illustrates in cross section a conventional electromagnetic spring-wound clutch of the aforementioned kind. This clutch is especially adapted to be installed between the output shaft of an automotive engine and a refrigerant compressor for automotive air conditioners to transmit torque from the engine to the compressor. Reference numeral 1 designates a pulley 1 which is intended to serve as a driving member adapted for engagement with the output shaft of an automotive engine, not shown, to be rotatively driven by the engine. A hub 2 is arranged in axial alignment with the pulley 1 for rotation about a common axis, and is secured to the drive shaft (the driven shaft) 3 of a refrigerant compressor, not shown. A coil spring 4 is disposed around both a boss 1a formed on the pulley 1 and axially extending toward the hub 2 and the hub 2 for gripping engagement therewith. The coil spring 4 has its one end 4a engaged in an engaging groove 2a formed in the hub 2 and its other end 4b in an engaging groove 5a formed in a clutch armature plate 5 which is axially movably fitted on the boss 1a of the pulley 1, respectively. The clutch armature plate 5, which is formed of an annular member made of a magnetic material, is interposed between the pulley 1 and the coil spring 4 so that upon actuation of the clutch, it is brought into frictional engagement with a corresponding radially extending end wall (frictional engagement wall) 1b formed on the pulley 1. Reference numeral 8 designates a retainer member which has a tubular axial extension 8a formed at its central portion on which is fitted a radial ball bearing 9. The pulley 1 has its boss 1a fitted on the retainer member 8 via this radial ball bearing 9 for rotation relative to the member 8. The retainer member 8 is to be secured to one end of the refrigerant compressor, not shown, by means of bolts 10. A cover 11 is secured to the hub 2 by means of bolts 12, only one of which is shown, each threadedly inserted in the hub 2, in a fashion enclosing the coil spring 4, the clutch armature plate 5, etc. An annular recess 1c is formed in the pulley 1 at its end remote from the coil spring 4 and the clutch armature plate 5, which recess forms a stationary coil housing in cooperation with a peripheral edge of the retainer member 8, in which is mounted an electromagnetic coil 6. The hub 2 has an axially inwardly extending boss 2b penetrated by and keyed to one end of the drive shaft 3 by means of a key 13 for the drive shaft 3 to rotate in unison with the hub 2. The drive shaft 3 in turn is secured to the hub 2 by means of a nut 14 threadedly fitted on a tip of the shaft 3.

With the above arrangement, when the electromagnetic coil 6 which is disposed close to the pulley 1 is energized, the clutch armature plate 5 is attracted and drawn toward the pulley 1 into frictional face-to-face contact with the friction engagement wall 1b due to electromagnetic force produced by the energization of the coil 6. Consequently, the coil spring 4 is wound into gripping engagement with the boss 1a of the pulley 1 and the hub 2 to bring the pulley 1 and the hub 2 or the drive shaft 3 of the refrigerant compressor into driving engagement with each other.

However, according to the conventional magnetic clutch arrangement, the speed at which the clutch armature plate 5 is drawn toward the pulley 1 due to magnetic attraction and the speed at which the coil spring 4 is wound onto the pulley 1 and the hub 2 are substantially equal to each other. As a consequence, if the clutch is actuated when the engine is rotating at a high speed, that is, the pulley 1 is being rotated at a correspondingly high speed, much larger impact load is abruptly imparted to the driven shaft and its related parts than the value of torque loaded on them during usual operation, which may cause deformation or breakage of the component parts of the driven device, that is, the refrigerant compressor and the electromagnetic clutch. Further, there occurs an abrupt collision between the coil spring 4 and the parts onto which the coil spring 4 is wound, which causes the occurrence of frictional noise as well as large abrasion in the coil spring and its surrounding parts.

Figure 2:
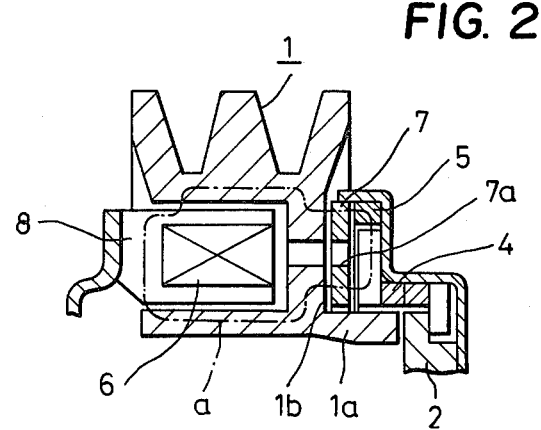
FIG. 2 is a fragmentary cross-sectional view of an electromagnetic spring-wound clutch according to an embodiment of the present invention.
Figure 3:
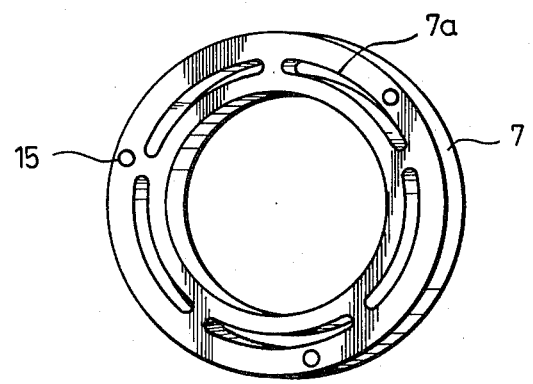
FIG. 3 is a perspective view of an auxiliary clutch armature plate applicable to the electromagnetic spring-wound clutch.
Figure 4:
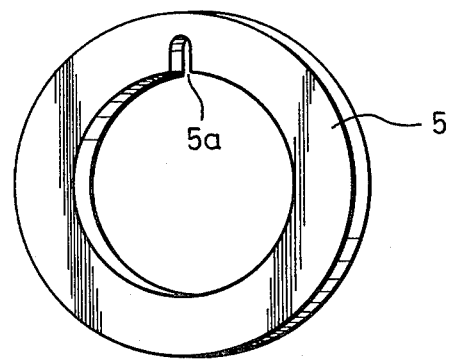
FIG. 4 is a perspective view of a clutch armature plate applicable to the electromagnetic spring-wound clutch.

Referring to FIG. 2, there is shown a fragmentary cross-sectional view of an electromagnetic spring-wound clutch according to an embodiment of the present invention. The other portions of the clutch than those illustrated are substantially identical in shape and arrangement with corresponding ones of the conventional clutch illustrated in FIG. 1. In FIG. 2, corresponding parts to those in FIG. 1 are designated by like reference characters. As illustrated an auxiliary clutch armature plate 7 is interposed between the clutch armature plate 5 and the pulley 1 for rotation relative to the members 5, 1. This plate 7 is axially movably fitted on the boss 1b of the pulley 1 and disposed opposite the frictional engagement wall 1b of the pulley 1. In the illustrated embodiment, the pulley 1, the clutch armature plate 5 and the auxiliary clutch armature plate 7 are arranged immediately adjacent each other and in axial alignment with each other. They can be all brought into and kept in direct frictional engagement with each other in one body upon and during engagement of the clutch. As shown in FIG. 3, the auxiliary clutch armature plate 7 is formed of an annular member made of a magnetic material and formed with a plurality of holes 7a axially extending therethrough and circumferentially arranged at equal intervals. The holes 7a each have a circumferentially elongate shape. The auxiliary clutch armature plate 7 may have a plurality of, e.g., three permanent magnets 15 embedded in and end face facing toward the pulley 1 in such a manner that the exteriorly exposed surfaces of the magnets 15 are flush with the associated end surface of the armature plate 7. During deenergization of the electromagnetic coil 6, the magnets 15 cause the armature plate 7 to be attracted toward and held in contact with the friction engagement wall 1b of the pulley to prevent the occurrence of noise which could otherwise be caused by vibration or swinging of the armature plate 7 in a free state. The magnets 15 should have weak magnetic force enough to permit the armature plate 7 to slip on the wall 1b upon energization of the electromagnetic coil 6, as hereinlater described. The magnets 15 may be similarly embedded in the above wall 1b of the pulley. The clutch armature plate 5 is formed of an annular member similar in shape to a conventional one, as shown in FIG. 4, Which is formed at its inner peripheral wall with an engaging groove 5a in which one end of the coil spring 4 is to be engaged.

When the magnetic coil 6 is energized to actuate the clutch, a magnetic flux path is formed which is configurated as indicated by the dotted line a in FIG. 2 owing to the presence of the holes 7a in the plate 7, and which starts from the magnetic coil 6, and extends through the retainer member 8, the pulley 1, the auxiliary clutch armature plate 7, the clutch armature plate 5, and again through the auxiliary armature plate 7 and the pulley 1, and returns to the retainer member 8. The magnetic flux causes attraction of the clutch armature plate 5 and the auxiliary clutch armature plate 7 toward the pulley 1 to bring the plate 5 and the auxiliary clutch armature plate 7 into frictional engagement with the radial wall 1b of the pulley 1. On this occasion, due to the presence of the auxiliary armature plate 7 which is rotatable relative to the radial wall 1b of the pulley 1 and the clutch armature plate 5, there occur slight slips in the circumferential direction between the auxiliary clutch armature plate 7 and the radial wall 1b of the pulley 1, and also between the auxiliary clutch armature plate 7 and the clutch armature plate 5, immediately followed by frictional engagement of the armature plate 7 with the radial wall 1b of the pulley 1. Almost simultaneously with this frictional engagement, also the clutch armature plate 5 is frictionally engaged by the auxiliary clutch armature plate 7. The above slippage of the armature plates 5, 7 cases displacement of same with respect to the rotational angle of the pulley 1 in the direction opposite to the rotating direction of the pulley 1, that is, the winding direction of the coil spring 4 so that the winding speed of the coil spring 4 is lower that the engaging or drawn speed of the clutch armature plate 5, thus reducing the impact load to be imparted to the hub 2 and the driven shaft 3. The winding speed of the coil spring 4 decreases in inverse proportion to the amount of relative slippage between the pulley radial wall 1b and the clutch armature plate 5. Since this amount of relative slippage becomes larger with an increase in the engine speed, the arrangement of the invention is particularly effective in restraining the impact load to be imparted to the driven shaft when the clutch is actuated under a high engine speed condition. The amount of relative slippage between the radial wall 1b of the pulley 1 and the clutch armature plate 5 caused upon actuation or engagement of the clutch can be adjusted by suitably selecting the size, location or number of the holes 7a formed in the auxiliary clutch armature plate 7 or the thickness of the plate 7, etc. so as to control the amount of magnetic flux passing the plate 7. In the illustrated embodiment, only one auxiliary clutch armature plate 7 is used. However, a plurality of such plates may be used, if required.

Obviously many modifications and variations of the present invention are possible in the light of the above teachings. It is therefore to be understood that within the scope of the appended claims the invention may be practiced otherwise than as specifically described.

What is claimed is:

1. An electromagnetic spring-wound clutch comprising: a rotatably disposed driving member; a driven member arranged in axial alignment with said driving member for rotation about a common axis; a stationary coil housing; an electromagnetic coil mounted in said coil housing; a coil spring mounted around said driving and driven members for gripping engagement therewith, said coil spring having one end thereof operatively connected to said driven member; an annular first clutch armature member operatively connected to the other end of said coil spring facing said driving member, said first clutch armature member being formed of a magnetic material; and at least one second clutch armature member interposed between said driving member and said first clutch armature member, for rotation relative to both of said driving member and said first clutch armature member when said electromagnetic coil is deenergized said at least one second clutch armature member being formed of a magnetic material; said driving member having a radially extending surface arranged opposite said at least one second clutch armature member for frictional engagement therewith; said driving member and said first and second clutch armature members being disposed immediately adjacent each other and in axial alignment with each other; said electromagnetic coil, when energized, producing electromagnetic force to thereby cause attraction of said first clutch armature member and said at least one second clutch armature member toward said driving member to bring said first and second clutch armature members and said driving member into frictional engagement with each other immediately after occurrence of slight slips between said surface of said driving member and one of said at least one second clutch armature member adjacent thereto and between adjacent ones of said first clutch armature member and said at least one second clutch armature member, thereby reducing the speed of winding of said coil spring around said driving member and said driven member to a value below the speed of engagement of said first clutch armature member with said driving member.

2. The electromagnetic spring-wound clutch as claimed in claim 1, wherein said at least one second clutch armature member comprises an annular member which includes a plurality of holes axially extending therethrough and circumferentially arranged in said annular member.

3. The electromagnetic spring-wound clutch as claimed in claim 2, wherein said plurality of holes formed in said at least one second clutch armature member each have a circumferentially elongate shape.

4. The electromagnetic spring-wound clutch as claimed in any one of the preceding claims, including magnet means provided between said radially extending surface of said driving member and said at least one second clutch armature member, for causing said at least one second clutch armature member to be attracted toward and held in contact with said radially extending surface during deenergization of said electromagnetic coil.

5. An electromagnetic spring-wound clutch comprising: a rotatably disposed driving member; a driven member arranged in axial alignment with said driving member for rotation about a common axis; a stationary coil housing; an electromagnetic coil mounted in said coil housing; a coil spring mounted around said driving and driven members for gripping engagement therewith, said coil spring having one end thereof operatively connected to said driven member; an annular first clutch armature member operatively connected to the other end of said coil spring facing said driving member; and at least one second clutch armature member rotatably interposed between said driving member and said first clutch armature member; said driving member having a radially extending surface arranged opposite said at least one second clutch armature member for frictional engagement therewith; said driving member and said first and second clutch armature members being disposed immediately adjacent each other and in axial alignment with each other; said electromagnetic coil, when energized, producing electromagnetic force to thereby cause attraction of said first clutch armature member and said at least one second clutch armature member toward said driving member to bring said first and second clutch armature members and said driving member into firctional engagement with each other immediately after occurrence of slight slips between said surface of said driving member and one of said at least one second clutch armature member adjacent thereto and between adjacent ones of said first clutch armature member and said at least one second clutch armature member; and magnet means provided between said radially extending surface of said driving member and said at least one second clutch armature member for causing said at least one second clutch armature member to be attracted toward and held in contact with said radially extending surface during deenergization of said electromagnetic coil.

6. The electromagnetic spring-wound clutch as claimed in claim 5, wherein said at least one second clutch armature member comprises an annular member formed of a magnetic material and which includes a plurality of holes axially extending therethrough and circumferentially arranged in said annular member.

7. The electromagnetic spring-wound clutch as claimed in claim 6, wherein said plurality of holes formed in said at least one second clutch armature member each have a circumferentially elongate shape.

* * * * *

UNITED STATES PATENT AND TRADEMARK OFFICE
CERTIFICATE OF CORRECTION

PATENT NO. : 4,466,522

DATED : August 21, 1984

INVENTOR(S) : Tsunenori SHIBUYA

It is certified that error appears in the above-identified patent and that said Letters Patent is hereby corrected as shown below:

On the initial page of the patent, under the heading of

"[30]   Foreign Application Priority Data"   change the priority data to --Jul. 15, 1980 [JP]  Japan ..........

55-99393--.

Signed and Sealed this

Second Day of April 1985

[SEAL]

Attest:

DONALD J. QUIGG

*Attesting Officer*    *Acting Commissioner of Patents and Trademarks*